United States Patent [19]
Moritani

[11] Patent Number: 5,498,913
[45] Date of Patent: Mar. 12, 1996

[54] POWER SUPPLY CONTROL APPARATUS WITH A MANUALLY OPERABLE CONTROL SWITCH

[75] Inventor: Nakanobu Moritani, Tokyo, Japan

[73] Assignee: Seikosha Co., Ltd., Tokyo, Japan

[21] Appl. No.: 935,077

[22] Filed: Aug. 24, 1992

[30] Foreign Application Priority Data

Aug. 27, 1991 [JP] Japan ................................. 3-215412

[51] Int. Cl.⁶ ..................................................... H02J 7/34
[52] U.S. Cl. ................................................ 307/64; 307/66
[58] Field of Search ............................. 307/64–66, 23, 307/29, 48, 150; 320/6, 2

[56] References Cited

U.S. PATENT DOCUMENTS

| | | | |
|---|---|---|---|
| H1172 | 4/1993 | Gorniak | 307/48 |
| 4,890,005 | 12/1989 | Schornack | 307/87 |
| 4,997,562 | 3/1991 | Hill | 320/7 |
| 5,073,837 | 12/1991 | Baek | 361/92 |
| 5,130,562 | 7/1992 | Freymuth | 307/66 |
| 5,157,267 | 9/1992 | Shirata et al. | 290/38 R |
| 5,162,720 | 11/1992 | Lambert | 320/6 |

FOREIGN PATENT DOCUMENTS

| | | |
|---|---|---|
| 0028591 | 5/1981 | European Pat. Off. . |
| 324318 | 7/1989 | European Pat. Off. . |
| 468769 | 7/1991 | European Pat. Off. . |

OTHER PUBLICATIONS

Patent Abstracts of Japan, vol. 8, No. 204 (P–301) [1641], 18 Sep. 1984; & JP–A–59 90 063 (Matsushita Denko K.K.) 24 May 1984.

Primary Examiner—Peter S. Wong
Assistant Examiner—Aditya Krishnan
Attorney, Agent, or Firm—Jordan and Hamburg

[57] ABSTRACT

A backup power supply 7 is connected to a load via a switching circuit. When the supply of electric power from a main power supply is stopped, the backup power supply 7 supplies electric power to the load 8. When a given manual operation is performed, the switching circuit disconnects the backup power supply 7 from the load 8. When electric power is supplied form the main power supply 6 to the load 8, the switching circuit connects the preliminary power supply 7 to the load 8. The switching circuit is powered by the backup power supply 7.

7 Claims, 1 Drawing Sheet

POWER SUPPLY CONTROL APPARATUS WITH A MANUALLY OPERABLE CONTROL SWITCH

FIELD OF THE INVENTION

The present invention relates to a power supply supply control apparatus.

BACKGROUND OF THE INVENTION

In recent years, various electrical devices have been equipped with backup power supplies to prevent problems arising from a failure of the main power supply. For example, some modern time recorders use an AC power line as their main power supply. When the AC power line fails, the power supply is switched to the backup power supply to back up the stored data, the clock, and so on. These devices have a manual switch connected between the backup power supply and the load. When the device is shipped from the factory, this switch is operated to disconnect the backup power supply from the load, thus preventing wasteful consumption of the backup power supply. When the device is used, the switch is again operated to operatively connect the backup power supply to the load so that backup is enabled.

When using the above-described prior art device, the user often forgets to operate the switch of this device. In this case, the equipment is used while the backup power supply remains operatively disconnected therefrom. As a result, in the case of a failure of the main power supply, a fatal situation can arise since the electrical device is not backed up.

SUMMARY OF THE INVENTION

It is an object of the present invention to provide a power supply control apparatus which assures that the power supply is switched from the main power supply to a backup power supply in the event of a failure of the main power supply.

The above-described problems are solved in accordance with the invention by providing a backup power supply for supplying electric power to a load when the supply of electric power from a main power supply is stopped, and a switching means which is responsive to a given manual operation to disconnect the backup power supply from the load, and which is responsive to the application of electric power from the main power supply to the load to connect the backup power supply to the load. The switching means is preferably powered by the backup power supply.

BRIEF DESCRIPTION OF THE DRAWING

One embodiment of the present invention will now be described with reference to the accompanying drawings, wherein:

The single drawing FIGURE is an electrical circuit diagram showing one embodiment of the present invention.

DESCRIPTION OF THE PREFERRED EMBODIMENTS

Figure 1:
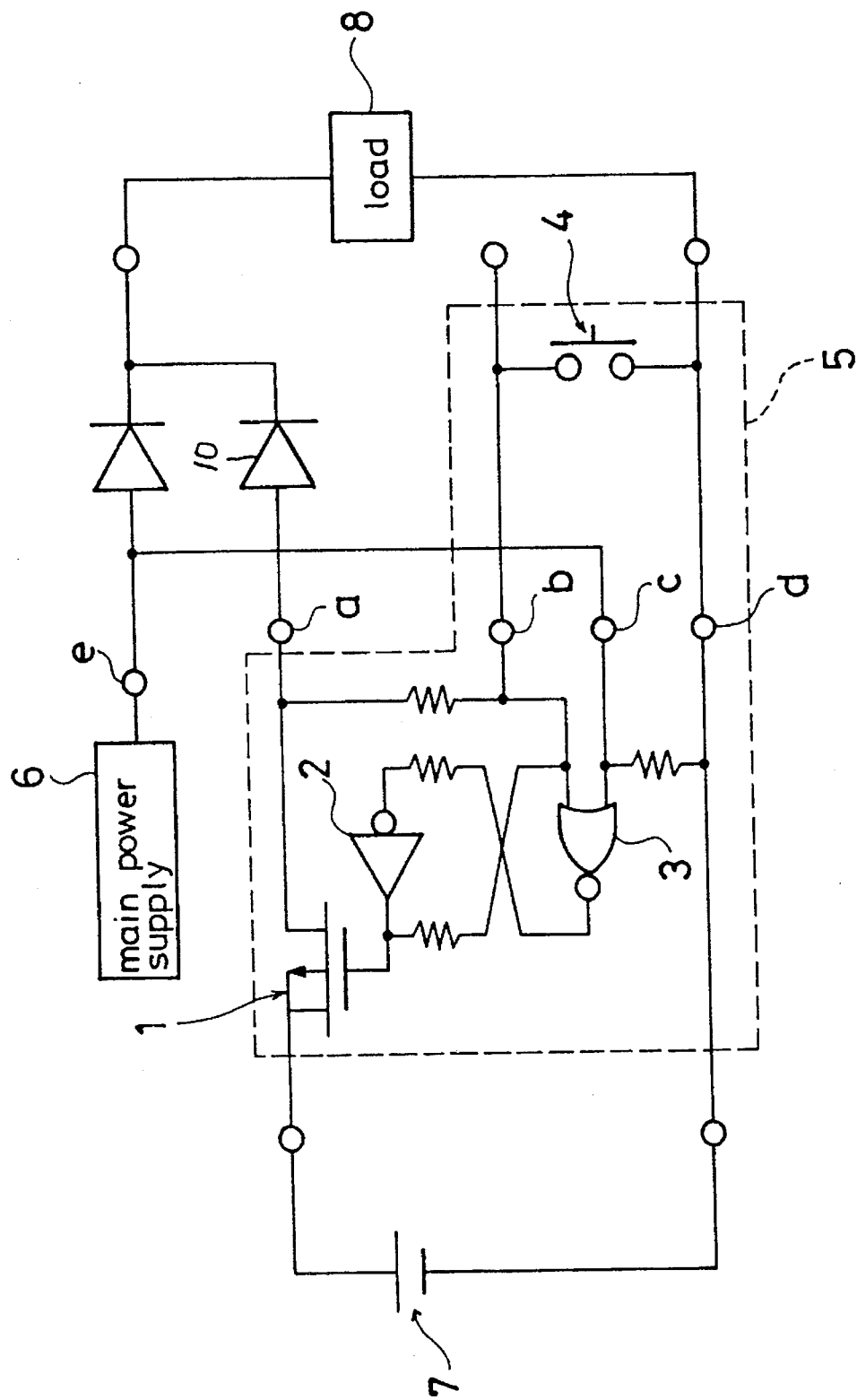

The drawing illustrates a transistor 1, an inverter 2, a NOR gate 3, and a reset switch 4 that initializes the apparatus. These components and a resistor cooperate to form a switching means 5. Numeral 6 denotes a main power supply. In the present embodiment, this main power supply converts AC power into a DC voltage of 5V.

Numeral 7 denotes a backup power supply. In the present embodiment, this backup power supply is a lithium battery of 3V. The load 8 may be an electrical circuit such as a storage circuit, a clock, or the like, that requires backup in the event of failure of the main power supply. The inverter 2 and the NOR gate 3 are powered by the backup power supply 7.

Prior to resetting of the present apparatus, the backup power supply 7 is mounted during fabrication of the apparatus. Then, the inverter 2 and the gate circuit 3 are energized, using the backup power supply 7 as their power supply. At this time, the conditions of the output signals of the apparatus are not stable. If the output signal from the inverter 2 is in state "1", the transistor 1 is conducting. Electric power is supplied from the backup power supply 7 to the load 8. Therefore, the backup power supply 7 will be consumed before the apparatus is set into operation. In view of this, when the present apparatus is shipped from the factory, the reset switch 4 is closed once to short-circuit terminals b and d. As a result, the condition at the terminal b is "0". Since there is no voltage at terminal c from the main power supply, both of the input signals to the gate 3 are now "0". The output signal of the gate 3 assumes state "1" and the output signal from the inverter 2 accordingly is set to state "0". Therefore, the transistor 1 is cut off. Electric power is no longer supplied from the backup power supply 7 to the load 8. Accordingly, when the apparatus is shipped from the factory and when it is kept in stock, wasteful consumption of the backup power supply 7 is prevented. This is the "reset condition". The inverter 2 and the gate 3 are powered by the backup power supply 7, but the electric power consumed by these circuits is negligibly small.

When the present apparatus is set into operation, if the main power supply 6 is connected to a terminal e of the present apparatus that has been reset, electric power is supplied therefrom to the load 8, so that the terminal c assumes state "1". As a result, the output signal from the gate 3 assumes state "0". The output signal from the inverter 2 accordingly assumes state "1". The transistor 1 now conducts, connecting the backup power supply 7 to the load 8 via a diode 10. However, no electric power is supplied from the backup power supply 7 to the load 8 at this time since the backup power supply is connected to the load 8 via the diode, and the main power supply 6 has a higher voltage. The load 8 is accordingly energized by the electric power from the main power supply 6.

At this time, if the terminals b and d are short-circuited by operating the reset switch 4, the output signal from the gate 3 remains in the state "0" since the terminal c is still in state "1". Therefore, the backup power supply 7 is still connected to the terminal a, but is blocked from the load 8 by the series diode 10 due to the higher voltage of the main power supply.

When the main power supply 6 fails, the terminal c assumes state "0". However, the terminal b is in state "1" and so the backup power supply 7 is now connected to the load 8 via the diode 10. As a consequence, the electric power source for the load 8 is switched to the backup power supply 7.

As described above, if the present apparatus is connected to the main power supply 6 and electric power is supplied, the backup power supply 7 is automatically connected to the diode 10 so that it can supply power to the load 8 when the main supply voltage is lower than the backup supply voltage. In the event of a failure of the main power supply 6, electric power is supplied from the backup power supply 7 to the load 8.

In accordance with the invention, wasteful consumption of the backup power supply is prevented between the time the apparatus is shipped from the factory and the instant at which the apparatus is set into operation. When the apparatus is set into operation, the backup power supply is automatically connected to the load if the main power supply voltage is below the backup power supply voltage. Hence, in the event of a failure of the main power supply, it is assured that the power supply is switched to the backup power supply, whereby the load can be backed up.

Although the present invention has been fully described by way of example with reference to the accompanying drawing, it is to be understood that various changes and modifications will be apparent to those skilled in the art. Therefore, unless such changes and modifications depart from the scope of the invention, they should be construed as being included therein.

What I claim is:

1. A power supply control apparatus comprising:
   a first terminal connection for connection to a backup power supply,
   a second terminal connection for connection to a main power supply,
   a third terminal connection for connection to a load,
   a manually operable control switch means connected between the first terminal connection and the third terminal connection,
   switching means for connecting said first terminal connection to said third terminal connection, and
   means for controlling said switching means to:
      inhibit connection of said first terminal connection to said third terminal connection in response to operation of said manually operable control switch means in the absence of a voltage at said second terminal connection, and
      connect said first terminal connection to said third terminal connection in response to the presence of a voltage at said second terminal connection, regardless of actuation of said manually operable control switch means,
   said means for controlling being connected to the second terminal connection, the manually operable control switch means and the switching means.

2. The power supply control apparatus of claim 1 further comprising a load terminal and a first diode connected between said third terminal connection and said load terminal, whereby a voltage at said load terminal exceeding a voltage at said third terminal connection inhibits conduction of said diode.

3. The power supply control apparatus of claim 1 wherein said means for controlling includes:
   a gate connected to control said switching means, said gate having first and second inputs,
   means connecting said manually operable control switch means to said first input, and
   means connecting said second terminal connection to said second input.

4. The power supply control apparatus of claim 3, wherein said switching means comprises a transistor.

5. The power supply control apparatus of claim 4, wherein said gate is a NOR gate, and further comprising an inverter connecting the output of said gate to said transistor.

6. The power supply control apparatus of claim 3 wherein said manually operable control switch means comprises means for connecting said first input to a reference potential.

7. The power supply control apparatus of claim 1 comprising means for energizing said apparatus from a voltage at said first terminal connection.

* * * * *